(12) United States Patent
Koenig et al.

(10) Patent No.: US 7,155,993 B2
(45) Date of Patent: Jan. 2, 2007

(54) DUAL CLUTCH TRANSMISSION HAVING A SYNCHRONIZER ACTUATION INTERLOCK CIRCUIT

(75) Inventors: Melissa Koenig, Howell, MI (US); Graham Annear, South Lyon, MI (US); William Vukovich, White Lake Township, MI (US)

(73) Assignee: BorgWarner Inc., Auburns Hills, MI (US)

(*) Notice: Subject to any disclaimer, the term of this patent is extended or adjusted under 35 U.S.C. 154(b) by 229 days.

(21) Appl. No.: 10/988,922

(22) Filed: Nov. 15, 2004

(65) Prior Publication Data

US 2006/0101933 A1    May 18, 2006

(51) Int. Cl.
F16H 3/08    (2006.01)

(52) U.S. Cl. ............................. 74/331; 74/333; 74/340

(58) Field of Classification Search ................ 74/331, 74/333, 340
See application file for complete search history.

(56) References Cited

U.S. PATENT DOCUMENTS

| | | | | |
|---|---|---|---|---|
| 3,589,483 A | 6/1971 | Smith | ........................ | 192/3.52 |
| 4,461,188 A | 7/1984 | Fisher | ........................ | 74/330 |
| 4,513,631 A | 4/1985 | Koivunen | .................... | 74/360 |
| 4,544,057 A | 10/1985 | Webster et al. | .......... | 192/0.076 |
| 4,827,784 A | 5/1989 | Muller et al. | .................. | 74/330 |
| 5,662,198 A | 9/1997 | Kojima et al. | ............ | 192/87.11 |
| 5,711,409 A | 1/1998 | Murata | .................... | 192/87.11 |
| 5,720,203 A | 2/1998 | Honda et al. | .................. | 74/325 |
| 5,890,392 A | 4/1999 | Ludanek et al. | .............. | 74/331 |
| 5,915,512 A | 6/1999 | Adamis et al. | ............ | 192/3.61 |
| 5,950,781 A | 9/1999 | Adamis et al. | ............ | 192/3.61 |
| 5,966,989 A | 10/1999 | Reed, Jr. et al. | ............... | 74/331 |
| 5,979,257 A | 11/1999 | Lawrie | ........................ | 74/335 |
| 6,006,620 A | 12/1999 | Lawrie et al. | ................ | 74/335 |
| 6,012,561 A | 1/2000 | Reed, Jr. et al. | ............ | 192/48.2 |
| 6,044,719 A | 4/2000 | Reed, Jr. et al. | ............. | 74/330 |
| 6,145,398 A | 11/2000 | Bansbach et al. | ............. | 74/335 |
| 6,286,381 B1 | 9/2001 | Reed, Jr. et al. | ............. | 74/336 |
| 6,364,809 B1 | 4/2002 | Cherry | ........................ | 477/86 |
| 6,869,382 B1* | 3/2005 | Leising et al. | ................ | 477/77 |
| 6,953,417 B1* | 10/2005 | Koenig | ........................ | 477/181 |
| 7,073,407 B1* | 7/2006 | Stefina | ........................ | 74/331 |

FOREIGN PATENT DOCUMENTS

GB    2 036 203 A    11/1980
JP    2005-147403    *  6/2005

* cited by examiner

Primary Examiner—Ha Ho
(74) Attorney, Agent, or Firm—Greg Dziegielewski; Bliss McGlynn, P.C.

(57) ABSTRACT

A dual clutch transmission for a motor vehicle having a synchronizer actuation interlock system includes two input shafts, a counter shaft, and a plurality of gear sets rotatively disposed on the shafts. The gear sets are adapted to be operatively engaged to and disengaged from their respective shafts. A plurality of synchronizers are disposed about the gear sets and the synchronizers are adapted to operatively engage and disengage the gear sets to and from their respective shafts. A plurality of hydraulically actuated shift actuators are each operatively connected to one of the plurality of synchronizers. Each shift actuator is adapted to cause its respective synchronizer to engage and disengage its respective gear sets to and from their respective shaft and further adapted to provide a hydraulic interlock that prevents an associated shift actuator on the same shaft from hydraulically actuating when the shift actuator is already engaged.

10 Claims, 5 Drawing Sheets

DUAL CLUTCH TRANSMISSION HAVING A SYNCHRONIZER ACTUATION INTERLOCK CIRCUIT

BACKGROUND OF THE INVENTION

1. Field of the Invention

The present invention relates, generally to a dual clutch transmission for a motor vehicle and, more specifically, to a dual clutch transmission having a synchronizer actuation interlock circuit used to prevent the concurrent actuation of more than one synchronizer on the same input shaft at the same time.

2. Description of the Related Art

Generally speaking, land vehicles require a powertrain consisting of three basic components. These components include a power plant (such as an internal combustion engine), a power transmission, and wheels. The power transmission component is typically referred to simply as the "transmission." Engine torque and speed are converted in the transmission in accordance with the tractive-power demand of the vehicle. Presently, there are two typical transmissions widely available for use in conventional motor vehicles. The first, and oldest type is the manually operated transmission. These transmissions include a foot operated start-up or launch clutch that engages and disengages the driveline with the power plant and a gearshift lever to selectively change the gear ratios within the transmission. When driving a vehicle having a manual transmission, the driver must coordinate the operation of the clutch pedal, the gearshift lever and the accelerator pedal to achieve a smooth and efficient shift from one gear to the next. Manual transmissions are relatively simple and robust and provide good fuel economy by having a direct power connection from the engine to the final drive wheels of the vehicle. Additionally, since the operator is given complete control over the timing of the shifts, the operator is able to dynamically adjust the shifting process so that the vehicle can be driven most efficiently. One disadvantage of the manual transmission is that there is an interruption in the drive connection during gear shifting. This results in losses in efficiency. In addition, there is a great deal of physical interaction required on the part of the operator to shift gears in a vehicle that employs a manual transmission.

The second, and newer choice for the transmission of power in a conventional motor vehicle is an automatic transmission. Automatic transmissions offer ease of operation. The driver of a vehicle having an automatic transmission is not required to use both hands, one for the steering wheel and one for the gearshift, and both feet, one for the clutch and one for the accelerator and brake pedal in order to safely operate the vehicle. In addition, an automatic transmission provides greater convenience in stop and go situations, because the driver is not concerned about continuously shifting gears to adjust to the ever-changing speed of traffic. Although conventional automatic transmissions avoid an interruption in the drive connection during gear shifting, they suffer from the disadvantage of reduced efficiency because of the need for hydrokinetic devices, such as torque converters, interposed between the output of the engine and the input of the transmission for transferring kinetic energy therebetween. In addition, automatic transmissions are typically more mechanically complex and therefore more expensive than manual transmissions.

For example, torque converters typically include impeller assemblies that are operatively connected for rotation with the torque input from an internal combustion engine, a turbine assembly that is fluidly connected in driven relationship with the impeller assembly and a stator or reactor assembly. These assemblies together form a substantially toroidal flow passage for kinetic fluid in the torque converter. Each assembly includes a plurality of blades or vanes that act to convert mechanical energy to hydrokinetic energy and back to mechanical energy. The stator assembly of a conventional torque converter is locked against rotation in one direction but is free to spin about an axis in the direction of rotation of the impeller assembly and turbine assembly. When the stator assembly is locked against rotation, the torque is multiplied by the torque converter. During torque multiplication, the output torque is greater than the input torque for the torque converter. However, when there is no torque multiplication, the torque converter becomes a fluid coupling. Fluid couplings have inherent slip. Torque converter slip exists when the speed ratio is less than 1.0 (RPM input>than RPM output of the torque converter). The inherent slip reduces the efficiency of the torque converter.

While torque converters provide a smooth coupling between the engine and the transmission, the slippage of the torque converter results in a parasitic loss, thereby decreasing the efficiency of the entire powertrain. Further, the torque converter itself requires pressurized hydraulic fluid in addition to any pressurized fluid requirements for the actuation of the gear shifting operations. This means that an automatic transmission must have a large capacity pump to provide the necessary hydraulic pressure for both converter engagement and shift changes. The power required to drive the pump and pressurize the fluid introduces additional parasitic losses of efficiency in the automatic transmission.

In an ongoing attempt to provide a vehicle transmission that has the advantages of both types of transmissions with fewer of the drawbacks, combinations of the traditional "manual" and "automatic" transmissions have evolved. Most recently, "automated" conventional manual transmissions have been developed which shift automatically without any input from the vehicle operator. Such automated manual transmissions typically include a plurality of power-operated actuators that are controlled by a transmission controller or some type of electronic control unit (ECU) to automatically shift synchronized clutches that control the engagement of meshed gear wheels traditionally found in manual transmissions. The design variants have included either electrically or hydraulically powered actuators to affect the gear changes. However, even with the inherent improvements of these newer automated transmissions, they still have the disadvantage of power interruption in the drive connection between the input shaft and the output shaft during sequential gear shifting. Power interrupted shifting results in a harsh shift feel that is generally considered to be unacceptable when compared to smooth shift feel associated with most conventional automatic transmissions.

To overcome this problem, other automated manual type transmissions have been developed that can be power-shifted to permit gearshifts under load conditions. Examples of such power-shifted automated manual transmissions are shown in U.S. Pat. No. 5,711,409 issued on Jan. 27, 1998 to Murata for a Twin-Clutch Type Transmission, and U.S. Pat. No. 5,966,989 issued on Apr. 4, 2000 to Reed, Jr. et al for an Electro-mechanical Automatic Transmission having Dual Input Shafts. These particular types of automated manual transmissions have two clutches and are generally referred to simply as dual, or twin, clutch transmissions. The dual clutch structure is most often coaxially and cooperatively configured so as to derive power input from a single engine flywheel arrangement. However, some designs have a dual clutch assembly that is coaxial but with the clutches located on opposite sides of the transmissions body and having different input sources. Regardless, the layout is the equivalent of having two transmissions in one housing, namely one power transmission assembly on each of two input shafts concomitantly driving one output shaft. Each transmission can be shifted and clutched independently. In this manner, uninterrupted power upshifting and downshifting between gears, along with the high mechanical efficiency of a manual transmission is available in an automatic transmission form. Thus, significant increases in fuel economy and vehicle performance may be achieved through the effective use of certain automated manual transmissions.

The dual clutch transmission structure may include two dry disc clutches each with their own clutch actuator to control the engagement and disengagement of the two-clutch discs independently. While the clutch actuators may be of the electro-mechanical type, since the lubrication system within the transmission requires a pump, some dual clutch transmissions utilize hydraulic shifting and clutch control. These pumps are most often gerotor types, and are much smaller than those used in conventional automatic transmissions because they typically do not have to supply a torque converter. Thus, any parasitic losses are kept small. Shifts are accomplished by engaging the desired gear prior to a shift event and subsequently engaging the corresponding clutch. With two clutches and two inputs shafts, at certain times, the dual clutch transmission may be in two different gear ratios at once, but only one clutch will be engaged and transmitting power at any given moment. To shift to the next higher gear, first the desired gears on the input shaft of the non-driven clutch assembly are engaged, then the driven clutch is released and the non-driven clutch is engaged.

This requires that the dual clutch transmission be configured to have the forward gear ratios alternatingly arranged on their respective input shafts. In other words, to perform up-shifts from first to second gear, the first and second gears must be on different input shafts. Therefore, the odd gears will be associated with one input shaft and the even gears will be associated with the other input shaft. In view of this convention, the input shafts are generally referred to as the odd and even shafts. Typically, the input shafts transfer the applied torque to a single counter shaft, which includes mating gears to the input shaft gears. The mating gears of the counter shaft are in constant mesh with the gears on the input shafts. The counter shaft also includes an output gear that is meshingly engaged to a gear on the output shaft. Thus, the input torque from the engine is transferred from one of the clutches to an input shaft, through a gear set to the counter shaft and from the counter shaft to the output shaft.

Gear engagement in a dual clutch transmission is similar to that in a conventional manual transmission. One of the gears in each of the gear sets is disposed on its respective shaft in such a manner so that it can freewheel about the shaft. A synchronizer is also disposed on the shaft next to the freewheeling gear so that the synchronizer can selectively engage the gear to the shaft. To automate the transmission, the mechanical selection of each of the gear sets is typically performed by some type of actuator that moves the synchronizers. A reverse gear set includes a gear on one of the input shafts, a gear on the counter shaft, and an intermediate gear mounted on a separate counter shaft meshingly disposed between the two so that reverse movement of the output shaft may be achieved.

While these power-shift dual clutch transmissions overcome several drawbacks associated with conventional transmissions and the newer automated manual transmissions, it has been found that controlling and regulating the automatically actuated dual clutch transmissions is a complicated matter and that the desired vehicle occupant comfort goals have not been achievable in the past. There are a large number of events to properly time and execute within the transmission for each shift to occur smoothly and efficiently. Conventional control schemes and methods have generally failed to provide this capability. Accordingly, there exists a need in the related art for better methods of controlling the operation of dual clutch transmissions.

One area of concern relates to the control of the actuation of synchronizers of the dual clutch transmission in the event of a synchronizer fault. More particularly, if a fault would occur such that two synchronizers on the same shaft are allowed to become concurrently engaged, the resultant transmission "tie-up" would cause a catastrophic failure when the corresponding clutch was engaged. Current control methods have the general capability to actuate (engage and disengage) the synchronizers as needed. Additionally, they are capable of disabling certain functions of the dual clutch transmission to avoid the damaging tie-up condition if an individual synchronizer remains engaged when commanded to release and the failure is detectable. However, there are no conventional dual clutch transmission control schemes that avoid the problem of concurrent actuation of the synchronizers of the same shaft in the event of a failure of a sensor method or sensing device. Additionally, conventional dual clutch transmissions do not include any specific structural features necessary to avoid or overcome this problem.

More specifically, in conventional dual clutch transmissions, when all of the sensing devices and control methods are functioning and available, a synchronizer actuation fault is readily detectable. Presently, conventional control schemes for the synchronizers of dual clutch transmissions exist that provide feedback sensing of the operating positions of the synchronizer forks (engaged or disengaged). Sensing of the actuator movements that drive the synchronizers are also employed. Finally, the rotational shaft speeds may also be monitored to indicate that a synchronizer is engaged or disengaged. However, if a failure occurs in any of these detection methods, the control system is unable to detect a subsequent synchronizer actuation failure. In this case, a transmission "tie-up" is eminent. Furthermore, once a control method or sensing device fails such that a concurrent synchronizer actuation occurs, the conventional dual clutch transmissions cannot structurally prevent the "tie-up" condition.

Accordingly, there remains a need in the art for a dual clutch transmission that includes a hydraulic synchronizer actuation interlock system, which operatively prevents the concurrent engagement of two synchronizers on the same shaft at the same time. Furthermore, there remains a need in the art for a dual clutch transmission of this type that functions separately and independently from existing control methods.

SUMMARY OF THE INVENTION

The disadvantages of the related art are overcome by the present invention of a dual clutch transmission for a motor vehicle having a synchronizer actuation interlock system. The transmission includes a pair of input shafts, a counter shaft, and a plurality of gear sets rotatively disposed on the shafts. The gear sets are adapted to be operatively engaged to and disengaged from their respective shafts, and a plurality of synchronizers are disposed about the gear sets. The synchronizers are adapted to operatively engage and disengage the gear sets to and from their respective shafts. A plurality of hydraulically actuated shift actuators are each operatively connected to one of the plurality of synchronizers. Each of said plurality of shift actuators is adapted to cause the associated synchronizer to engage and disengage the associated gear sets to and from the associated shaft and are further adapted to provide a hydraulic interlock that prevents an associated shift actuator on the same shaft from hydraulically actuating when the shift actuator is already engaged.

Thus, the present invention overcomes the limitations of the current synchronizer control schemes by providing a hydraulic synchronizer actuation interlock system that operatively prevents the concurrent engagement of two synchronizers on the same shaft at the same time. The present invention accomplishes this separately and independently from existing control methods. Thus, the present invention not only provides the advantage of avoiding catastrophic failures relating to gearbox tie-ups, but also provides the advantage of operating beyond the boundaries of the control system and its possible failures relating to errant monitoring of transmission functions, failure of sensing devices, and failures in control method steps.

Other objects, features and advantages of the present invention will be readily appreciated, as the same becomes better understood after reading the subsequent description taken in connection with the accompanying drawings.

DETAILED DESCRIPTION OF THE PREFERRED EMBODIMENT(S)

Figure 1:
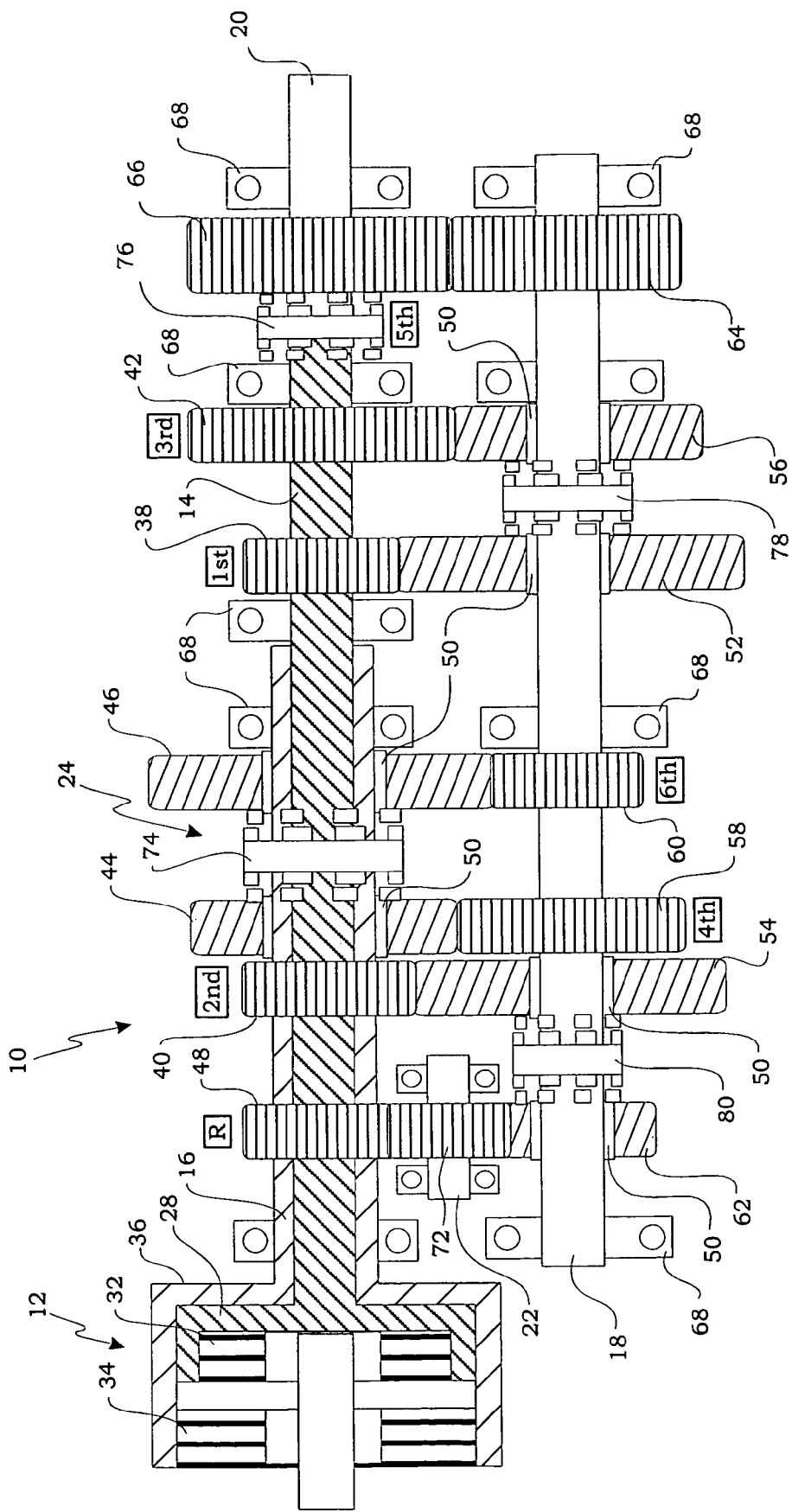
FIG. 1 is a generalized schematic illustration of a dual clutch transmission of the type that may be employed with the present invention.

A representative dual clutch transmission that may be controlled by the present invention is generally indicated at 10 in the schematic illustrated in FIG. 1. Specifically, as shown in FIG. 1, the dual clutch transmission 10 includes a dual, coaxial clutch assembly generally indicated at 12, a first input shaft, generally indicated at 14, a second input shaft, generally indicated at 16, that is coaxial to the first, a counter shaft, generally indicated at 18, an output shaft 20, a reverse counter shaft 22, a plurality of synchronizers, generally indicated at 24, and a plurality of shift actuators generally indicated at 26 (FIG. 2).

The dual clutch transmission 10 forms a portion of a vehicle powertrain and is responsible for taking a torque input from a prime mover, such as an internal combustion engine, and transmitting the torque through selectable gear ratios to the vehicle drive wheels. The dual clutch transmission 10 operatively routes the applied torque from the engine through the dual, coaxial clutch assembly 12 to either the first input shaft 14 or the second input shaft 16. The input shafts 14 and 16 include a first series of gears, which are in constant mesh with a second series of gears disposed on the counter shaft 18. Each one of the first series of gears interacts with one of the second series of gears to provide the different gear ratios sets used for transferring torque. The counter shaft 18 also includes a first output gear that is in constant mesh with a second output gear disposed on the output shaft 20. The plurality of synchronizers 24 are disposed on the two input shafts 14, 16 and on the counter shaft 18 and are operatively controlled by the plurality of shift actuators 26 to selectively engage one of the gear ratio sets. Thus, torque is transferred from the engine to the dual, coaxial clutch assembly 12, to one of the input shafts 14 or 16, to the counter shaft 18 through one of the gear ratio sets, and to the output shaft 20. The output shaft 20 further provides the output torque to the remainder of the powertrain. Additionally, the reverse counter shaft 22 includes an intermediate gear that is disposed between one of the first series of gears and one of the second series of gears, which allows for a reverse rotation of the counter shaft 18 and the output shaft 20. Each of these components will be discussed in greater detail below.

Specifically, the dual, coaxial clutch assembly 12 includes a first clutch mechanism 32 and a second clutch mechanism 34. The first clutch mechanism 32 is, in part, physically connected to a portion of the engine flywheel (not shown) and is, in part, physically attached to the first input shaft 14, such that the first clutch mechanism 32 can operatively and selectively engage or disengage the first input shaft 14 to and from the flywheel. Similarly, the second clutch mechanism 34 is, in part, physically connected to a portion of the flywheel and is, in part, physically attached to the second input shaft 16, such that the second clutch mechanism 34 can operatively and selectively engage or disengage the second input shaft 16 to and from the flywheel. As can be seen from FIG. 1, the first and second clutch mechanisms 32, 34 are coaxial and co-centric such that the outer case 28 of the first clutch mechanism 32 fits inside of the outer case 36 of the second clutch mechanism 34. Similarly, the first and second input shafts 14, 16 are also coaxial and co-centric such that the second input shaft 16 is hollow having an inside diameter sufficient to allow the first input shaft 14 to pass through and be partially supported by the second input shaft 16. The first input shaft 14 includes a first input gear 38 and a third input gear 42. The first input shaft 14 is longer in length than the second input shaft 16 so that the first input gear 38 and a third input gear 42 are disposed on the portion of the first input shaft 14 that extends beyond the second input shaft 16. The second input shaft 16 includes a second input gear 40, a fourth input gear 44, a sixth input gear 46, and a reverse input gear 48. As shown in FIG. 1, the second input gear 40 and the reverse input gear 48 are fixedly supported on the second input shaft 16 and the fourth input gear 44 and sixth input gear 46 are rotatably supported about the second input shaft 16 upon bearing assemblies 50 so that their rotation is unrestrained unless the accompanying synchronizer is engaged, as will be discussed in greater detail below.

The counter shaft 18 is a single, one-piece shaft that includes the opposing, or counter, gears to those on the inputs shafts 14, 16. As shown in FIG. 1, the counter shaft 18 includes a first counter gear 52, a second counter gear 54, a third counter gear 56, a fourth counter gear 58, a sixth counter gear 60, and a reverse counter gear 62. The counter shaft 18 fixedly retains the fourth counter gear 58 and sixth counter gear 60, while first, second, third, and reverse counter gears 52, 54, 56, 62 are supported about the counter shaft 18 by bearing assemblies 50 so that their rotation is unrestrained unless the accompanying synchronizer is engaged as will be discussed in greater detail below. The counter shaft 18 also fixedly retains a first drive gear 64 that meshingly engages the corresponding second driven gear 66 on the output shaft 20. The second driven gear 66 is fixedly mounted on the output shaft 20. The output shaft 20 extends outward from the transmission 10 to provide an attachment for the remainder of the powertrain.

The reverse counter shaft 22 is a relatively short shaft having a single reverse intermediate gear 72 that is disposed between, and meshingly engaged with, the reverse input gear 48 on the second input shaft 16 and the reverse counter gear 62 on the counter shaft 18. Thus, when the reverse gears 48, 62, and 72 are engaged, the reverse intermediate gear 72 on the reverse counter shaft 22 causes the counter shaft 18 to turn in the opposite rotational direction from the forward gears thereby providing a reverse rotation of the output shaft 20. It should be appreciated that all of the shafts of the dual clutch transmission 10 are disposed and rotationally secured within the transmission 10 by some manner of bearing assembly such as roller bearings, for example, shown at 68 in FIG. 1.

The engagement and disengagement of the various forward and reverse gears is accomplished by the actuation of the synchronizers 24 within the transmission. As shown in FIG. 1 in this example of a dual clutch transmission 10, there are four synchronizers 74, 76, 78, and 80 that are utilized to shift through the six forward gears and reverse. It should be appreciated that there are a variety of known types of synchronizers that are capable of engaging a gear to a shaft and that the particular type employed for the purposes of this discussion is beyond the scope of the present invention. Generally speaking, any type of synchronizer that is movable by a shift fork or like device may be employed. As shown in the representative example of FIG. 1, the gear sets are grouped in pairs. The synchronizers are two sided, dual actuated synchronizers slidingly disposed on one of the shafts between each gear set of the paired groupings of gear sets. Each synchronizer is thereby adapted to separately engage and disengage each gear set of the respective paired groupings of gear sets to and from their respective shaft when moved off of a center neutralized position to the right or left.

Specifically with reference to the example illustrated in FIG. 1, synchronizer 78 can be actuated to the left to engage the first counter gear 52 on the counter shaft 18 or actuated to the right to engage the third counter gear 56. Synchronizer 80 can be actuated to the left to engage the reverse counter gear 62 or actuated to the right to engage the second counter gear 54. Likewise, synchronizer 74 can be actuated to the left to engage the fourth input gear 44 or actuated to the right to engage the sixth input gear 46. Synchronizer 76 is actuated to the right to directly engage the end of the first input shaft 14 to the output shaft 20 thereby providing a direct 1:1 (one to one) drive ratio for fifth gear. There is no gear set to engage to the left of synchronizer 76. It should be appreciated that this example of the dual clutch transmission is representative and that other gear set, synchronizer, and shift actuator arrangements are possible within the dual clutch transmission 10 as long as the even and odd gear sets are disposed on opposite input shafts.

Figure 2A:
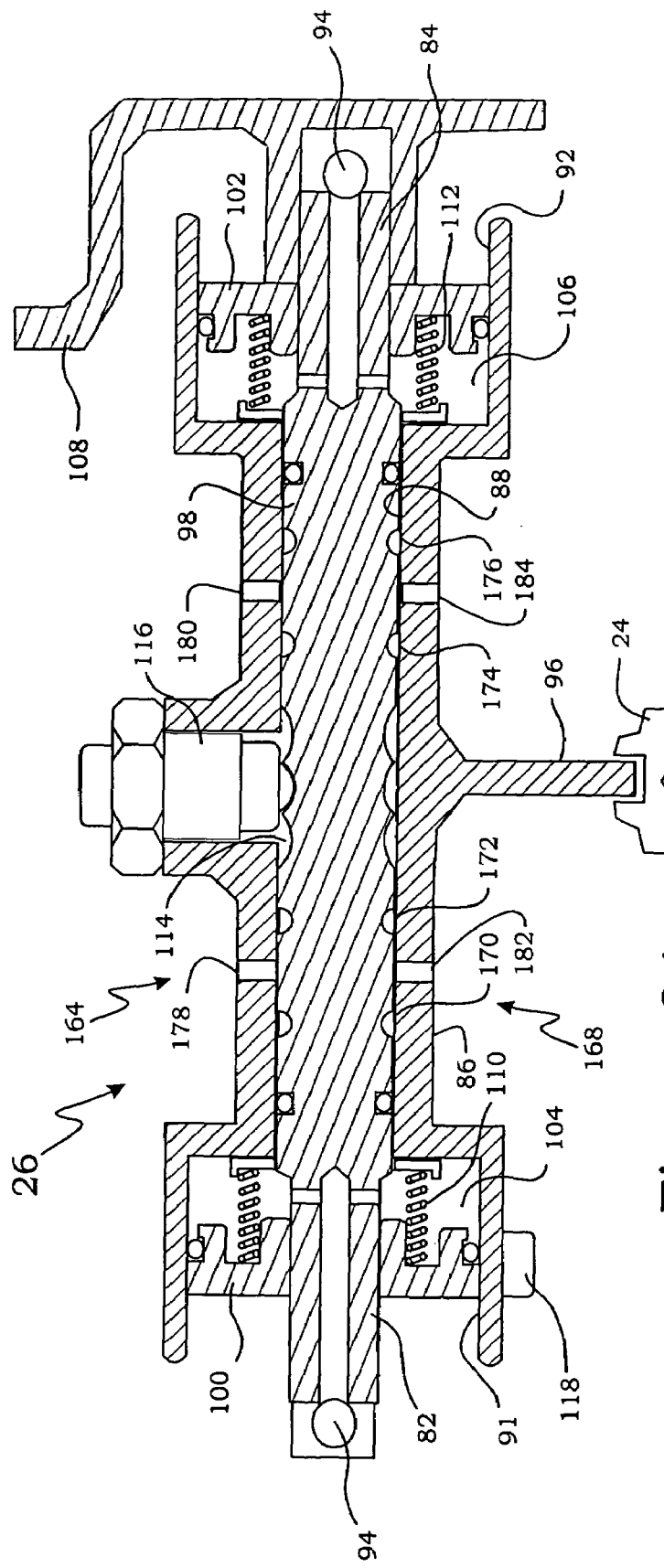
FIG. 2A is an cross-section side view of one example of a hydraulically actuated shift actuator of a dual clutch transmission of the type that may be employed by the present invention.
Figure 2B:
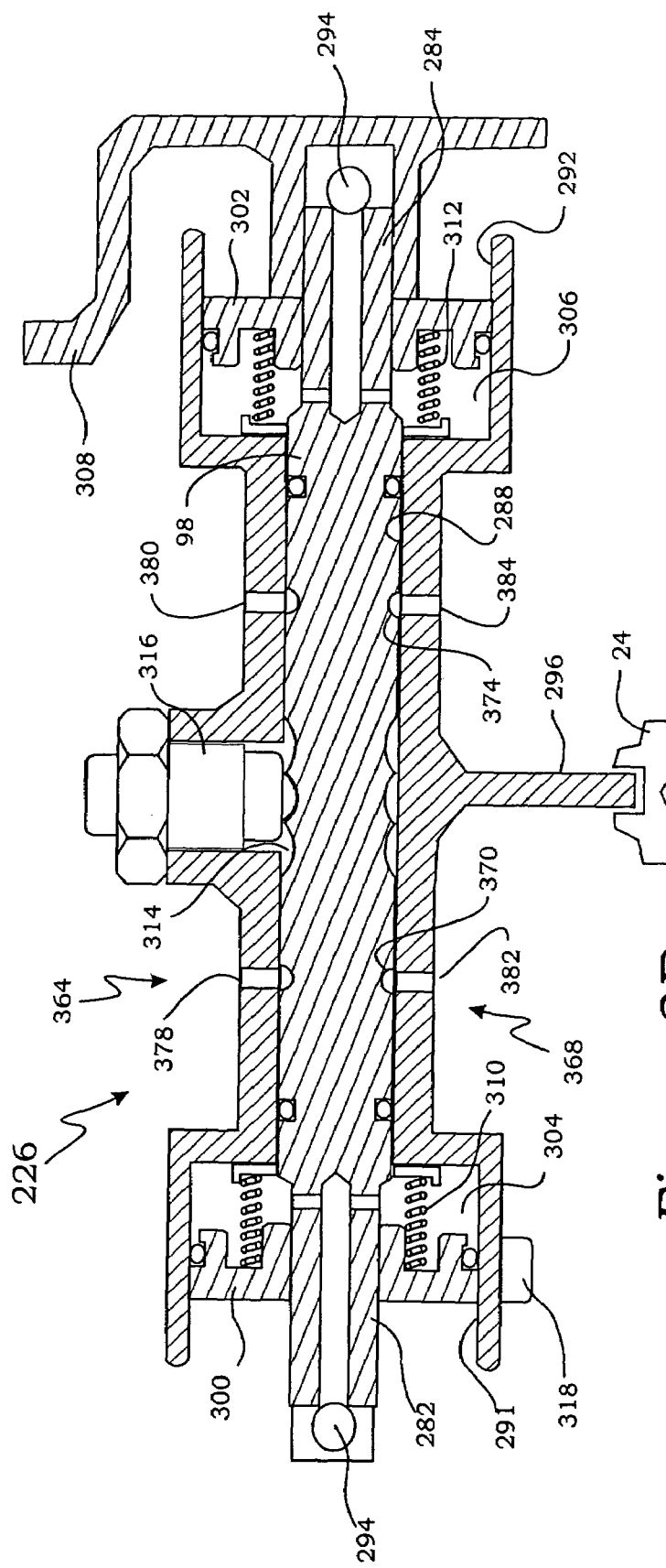
FIG. 2B is an cross-section side view of another example of a hydraulically actuated shift actuator of a dual clutch transmission of the type that may be employed by the present invention.

To actuate the synchronizers 74, 76, 78, and 80, this representative example of a dual clutch transmission 10 utilizes hydraulically driven shift actuators 26 with attached shift forks to selectively move the synchronizers so that they engage or disengage (neutralize) the desired gears. As shown in FIGS. 2A and 2B, the shift actuators 26 and 226 are essentially two way or dual action hydraulic valve assemblies that are driven back and forth linearly, in parallel to one of the input shafts 14, 16 or the counter shaft 18, to move a shift fork 96, one of the plurality of synchronizers 24, and ultimately a gear set in and out of engagement. Referring first to FIG. 2A, the hydraulically operated shift actuators 26 include an outer case 86 that includes a main bore 88 having two cylindrically shaped open ends 91, 92. A shift fork 96 is formed as part of the outer case 86 and extends radially outwards to engage a synchronizer that is disposed on one of the transmission shafts. A main shaft 98 is slidably disposed within the main bore 88 of the outer case 86. The main shaft 98 includes two opposing ends 82 and 84 upon which two piston 100, 102 are fixedly disposed, respectively. The pistons 100, 102 are moveable with respect to the cylindrically shaped open ends 91, 92 of the outer case 86. The interaction of each piston 100, 102 within its respective cylinder end 91, 92 forms an expansion chamber 104, 106. One of the ends 84 of the main shaft 98 is fixed to the body of the transmission 108. In this manner, the outer case 86 and shift fork 96 move relative to the fixed main shaft 98 so that the shift fork 96 will cause the synchronizer 24 to be moved. To affect movement of the outer case 86, the shifter fork 96, and thus the synchronizer 24, hydraulic fluid is selectively delivered under pressure to either one of the expansion chambers 104, 106 through the fluid passages 94.

When hydraulic pressure is applied to expansion chamber 104, the pressure acts against piston 100 and the cylinder shaped end 91 of the outer case 86 causing the outer case 86 and the shifter fork 96 to move to the right, as illustrated. When hydraulic pressure is applied to expansion chamber 106, the pressure acts against piston 102 and the cylinder shaped end 92 of the outer case 86 causing the outer case 86 and the shifter fork 96 to move to the left. The expansion chambers 104, 106 also contain biasing members 110, 112 such as springs, which assist in returning the outer case 86 to its center, thereby urging the outer case 86 and the shifter fork 96 to its neutral position. It should be appreciated that when disengaging a synchronizer 24 from an engaged position, the hydraulic pressure that was applied to actuate the shift actuator 26 to the current engagement position is removed and the opposing expansion chamber may be charged with enough pressure and for sufficient time to move the shift actuator 26 back to a neutralized position rather than relying solely on the biasing force of the biasing member. The main shaft 98 also includes a set of circumferential grooves 114, which work cooperatively with a spring loaded ball assembly, generally indicated at 116, disposed upon the outer case 86 to provide detent positioning and serve as positive locating points for the movement of the shift actuator 26. The outer case 86 also includes an externally mounted position sensor 118 that is used to monitor the position of the outer case 86 relative to the fixed main shaft 98 so that the actual position of the synchronizer 24 is always known.

It should be appreciated that the operation of the dual clutch transmission 10 is managed by some type of higher-level control device such as an electronic control unit (ECU) that oversees the functioning of the transmission 10, or by an electronic control unit for the vehicle in which the dual clutch transmission 10 may be installed. Regardless, there exists a control device that is beyond the scope of this invention, but that controls and operates the dual clutch transmission through a stored control scheme or series of control schemes. The control device having the capability of providing the proper voltages, signals, and/or hydraulic pressures to operate the transmission 10.

Figure 3:
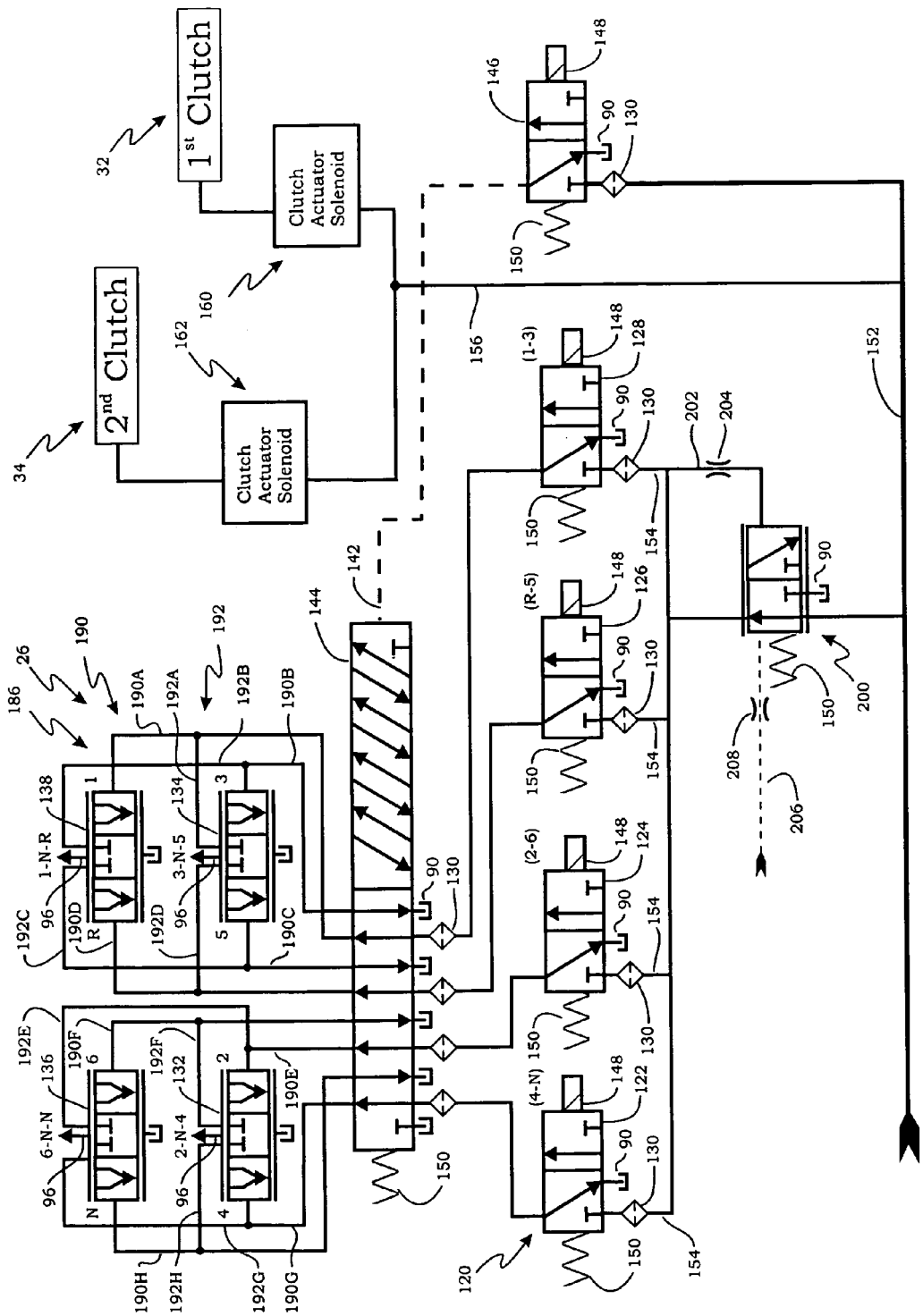
FIG. 3 is a schematic illustration of one example of a hydraulic actuation interlock circuit for the synchronizers of a dual clutch transmission of the type that utilizes the shift actuator of FIG. 2A and may be employed by the present invention.

The application of hydraulic pressure to the shift actuators 26 is operatively controlled by actuator solenoids, generally indicated at 120 in FIG. 3. The actuator solenoids 120 and shift actuators 26 are schematically represented. In this figure, all the actuator solenoids 120 are illustrated in the de-energized position. For clarity, the synchronizers 24 are not illustrated in FIG. 3 and the shift forks 96 are depicted as arrows extending from the shift actuators 26. As previously mentioned, each of the shift actuators 26 are two-way, dual action hydraulic assemblies operatively moving a two sided synchronizer 24 to engage their respective gear sets. Thus, as illustrated in FIG. 3, the shift actuators 26 each indicate the synchronizers and gear sets they engage when actuated to either the right or left. For example, shift actuator 132 is designated as the "2-N-4" shift actuator and causes its respective synchronizer (not shown) to engage second gear when actuated to the left and fourth gear when actuated to the right. "N" indicates the neutral center (disengaged) position.

As further shown in FIG. 3 with respect to this example of a dual clutch transmission 10, there are four actuator solenoids 122, 124, 126, and 128 that control the four shift actuators 132, 134, 136, and 138. Thus, each actuator solenoid 120 must provide pressure to both expansion chambers 104, 106 (left and right) for each shift actuator 26 to cause it to engage the synchronizers 24 in both directions. To this end, the actuator solenoids 120 are multiplexed (i.e., used for more than one operation) through the use of a multiplex valve 144. The multiplex valve 144 is controlled by a multiplex solenoid 146, which applies hydraulic pressure through line 142 to activate the multiplex valve 144 to the left, as illustrated. Through the multiplex valve 144, each actuator solenoid 120 provides the hydraulic pressure for two shift movements. The actuator solenoids 120 and the multiplex solenoid 146 are electrically controlled by the ECU through the application and interruption of a voltage to the coil assemblies 148 of the individual solenoids. The solenoids 120 and 146 have biasing members 150 that return the valve member to its normally closed position when de-energized, as shown in FIG. 3.

As previously mentioned, in the dual clutch transmission 10 the synchronizers 24, and thus their shift actuators 26, are oriented about two separate input shafts 14 and 16. Generally speaking, the odd gears (1, 3, 5, and R) reside on the first input shaft 14 and the even gears (2, 4, and 6) reside on the second input shaft 16. In this manner, as shown schematically in FIG. 3, the shift actuators 26 are grouped into respective pairs to support the synchronizers 24. Actuator solenoids 126 and 128 support the odd (first) input shaft and operatively control the odd gear shift actuators 134 and 138. Conversely, actuator solenoids 122 and 124 support the even (second) input shaft and operatively control the even gear shift actuators 132 and 136. It should be appreciated that even though the gear set distribution within the transmission places the gear sets on the odd and even input shafts with respect to the counter shaft, some of the synchronizers 24 and shift actuators 26 may also be mounted on the counter shaft as illustrated in the example of the dual clutch transmission shown in FIG. 1.

The first and second clutch mechanisms that operate the first and second clutches are generally indicated at 32 and 34 in FIG. 3. The clutch mechanisms 32, 34 are operatively engaged and disengaged in a coordinated manner relative to the actuation of the various gear sets by the shift actuators 26 to selectively transfer torque through a particular gear set to the output shaft 20 of the transmission 10. The first and second clutch mechanisms 32 and 34 are actuated by hydraulic pressure supplied by the first and second clutch actuator solenoids, which are schematically represented, and generally indicated at 160 and 162, respectively. A regulator valve 200 provides the operative hydraulic pressure through charge lines 154 and filters 130 to the actuator solenoids 122, 124, 126, and 128. The clutch actuators 160 and 162 are directly supplied with "line" hydraulic pressure as supplied from the pump (not shown) through hydraulic lines 152 and 156. Regulator valve 200 includes a bias spring 150 that causes the valve to be normally open to the right as illustrated in FIG. 3. The regulator valve 200 is also influenced by a feed back line 202 with a restrictor 204 and regulated line pressure through hydraulic line 206 and a restrictor 208. Excessive or residual pressurized hydraulic fluid at the various solenoids and valves releases its pressure and returns to the transmission sump as indicated at 90 throughout FIG. 3.

By way of example, if torque is being transferred to the drive wheels of the vehicle to initiate movement from a standing start, the lowest, or first, gear ratio of the dual clutch transmission 10 will likely be engaged. Therefore, as shown in FIG. 1, synchronizer 78 will be driven to the left (by shift actuator 138, FIG. 3) to engage the first counter gear 52 to the counter shaft 18 and the first clutch mechanism 32 will be engaged to transfer torque from the engine to the output shaft 20 through the first gear set. When vehicle speed increases and the ECU determines that the conditions require a shift to the second gear set, synchronizer 80 will first be driven to the right (by shift actuator 132, FIG. 3) to engage the second counter gear 54 to the counter shaft 18. Then the second clutch mechanism 34 will be engaged as the first clutch mechanism 32 is disengaged. In this manner, a powershift, where no power interruption occurs, is affected. Additionally, while engaged and driving a particular gear, the first and second clutch mechanisms 32 and 34 are controlled by certain stored routines that provide varying amounts of engagement force to the clutch discs and thereby operatively control the amount of torque transferred across the clutches and the resultant engine speed.

Given the complexity of the dual clutch transmission and its operating features, those having ordinary skill in the art will appreciate that the proper gear engagements and disengagements, in concert with operation of the two clutches must be controlled precisely. Furthermore, even when successful control methods are in place, it should be appreciated that failures in small monitoring and sensor components, as well as errors in control program steps could cause the transmission significant damage. As previously discussed, it is critically important to avoid the actuation of more than one synchronizer on the same shaft at the same time.

The synchronizer actuation interlock circuit schematically illustrated and generally indicated at 186 in FIG. 3 is specifically designed to avoid this situation. Similarly, the transmission employs shift actuators 26 (FIG. 2A) of a specific internal design with a particular routing of the pressurized hydraulic fluid to provide an interlock that hydraulically prohibits an attempt to engage a synchronizer if another synchronizer on the same shaft is already engaged. As shown in FIG. 2A, each of the shift actuators 26 includes at least one interlock passage, generally indicated at 164. In the preferred embodiment, the shift actuator 26 includes two pairs of interlock passages 170, 172 and 174, 176. More specifically, the main valve 98 includes four circumferential annular grooves that form the interlock passages 170, 172 and 174, 176. There are two inlets 178, 180 and two outlets 182, 184 formed in the outer case 86. The inlets 178 and 180 are in fluid communication with a source of pressurized hydraulic fluid as will be discussed below. The outlets 182 and 184 are in fluid communication with the sump 90 of the transmission.

The interlock passages 170, 172 and 174, 176 are adapted to be open and provide fluid communication from the inlets 178, 180 to the outlets 182, 184 when the shift actuator 26 has moved its respective synchronizer to an engaged position. When the shift actuator 26 is in a neutral position, the interlock passages 170, 172 and 174, 176 do not align with the inlets 178, 180 and outlets 182, 184 so that fluid communication is blocked at the inlets 178, 180 of the shift actuator 26. For example, with the shift actuator in its neutral, non-actuated position, the inlets 178 and 180 are not in fluid communication with the outlets 182 and 184 (i.e. interlock passages 170, 172, 174, and 176 are blocked). However, if the shift actuator 26 is operatively actuated and engaged to the left, inlet 178 is operatively connected to outlet 182 through interlock passage 172 and inlet 180 is operatively connected to outlet 184 through interlock passage 176. Conversely, if the shift actuator is operatively actuated and engaged to the right, inlet 178 is operatively connected to outlet 182 through interlock passage 170 and inlet 180 is operatively connected to outlet 184 through interlock passage 174.

Thus, when the present shift actuator 26 is in an engaged position, two of the interlock passages will align with their respective inlets and outlets to provide fluid communication from the inlets 178 and 180 to the transmission sump 90. As will be discussed below, the source of pressurized hydraulic fluid to actuate an associated shift actuator for the synchronizers on the same shaft is in common fluid communication with the inlets 178 and 180.

Thus, the pressurized hydraulic fluid required to cause a concurrent engagement of the associated shift actuator on the same shaft is dissipated to the transmission sump 90 when the present shift actuator is in an engaged position. In this manner, only one shift actuator, and thereby only one synchronizer and one gear set, can be engaged on the same shaft at a time.

Referring to FIG. 3, when installed in the dual clutch transmission, each of the four shift actuators 26 (FIG. 2A) are operatively controlled by the actuator solenoids 120 through the multiplex valve 144. In the preferred embodiment, the interlock circuit 186 includes a plurality of actuator hydraulic lines to provide fluid communication from the multiplex valve 144 to the shift actuators 26. Each of the plurality of hydraulic actuator lines are split having a first branch, generally indicated at 190 and a second branch, generally indicated at 192. The first, or actuator branch 190 is in fluid communication with the source of pressurized hydraulic fluid from the multiplex valve 144 to a first shift actuator 26 to operatively actuate the first shift actuator 26. The second, or interlock branch 192 provides fluid communication between the actuator branch 190 and the interlock passage inlet (178 or 180) of an associated shift actuator 26 on the same shaft to provide the interlock function.

For clarity in FIG. 3, each actuator branch 190 and its associated interlock branch 192 are indicated as a pair by a letter designation (A through H). For example, actuator branch 190A is routed from the multiplex valve 144 to the right side of the shift actuator 138 (1-N-R) to operatively actuate the synchronizer for the first gear. The associated interlock branch 192A is split off of the actuator branch 190A and is routed to an inlet (178, 180) of shift actuator 134 (3-N-5). Thus, when pressurized hydraulic fluid is selectively provided by actuator solenoid 128 through multiplex valve 144 to actuator branch 190A and interlock branch 192A, the fluid force will cause shift actuator 138 to move to the left and engage the first gear set depending upon the position of shift actuator 134 (3-N-5).

More precisely, if shift actuator 134 (3-N-5) is in the neutral position, meaning that neither the third or the fifth gear sets are engaged, then the interlock passages 174, 176, and 178, 180 are closed and the path to the transmission sump 90 is blocked, so that the fluid pressure in the actuator branch 190A and the interlock branch 192A is applied to move shift actuator 138 to the left to engage the first gear set. However, if shift actuator 134 is in either engaged position (third or fifth gear), the interlock passages (170 and 172, or 174 and 176) through shift actuator 134 are open allowing the fluid pressure in the actuator branch 190A to pass through the interlock branch 192A and shift actuator 134 to dissipate into the sump 90. Thus, interlock branch 192A prevents first gear from engaging (interlocked) when either the third or fifth gear sets are already engaged.

Similarly, in the remainder of the synchronizer actuation interlock circuit for the first input shaft (1, 3, 5, and R), interlock branch 192B prevents third gear from engaging (interlocked) when either the first or reverse gear sets are already engaged; interlock branch 192C prevents fifth gear from engaging when either first or reverse gears are already engaged; and interlock branch 192D prevents reverse gear from engaging when either third or fifth gears are already engaged. In the synchronizer actuation interlock circuit for the second input shaft (2, 4, and 6), interlock branch 192E prevents second gear from engaging (interlocked) when sixth gear is already engaged; interlock branch 192F prevents sixth gear from engaging when either second or fourth gears are already engaged; interlock branch 192G prevents fourth gear from engaging when sixth gear is already engaged; and interlock branch 192H prevents sixth gear from engaging when either second or fourth gears are already engaged.

Referring now to FIG. 2B, where like numerals incremented by 200 are used to designate like structure, another embodiment of a shift actuator employed with a dual clutch transmission of the present invention is generally indicated at 226. The shift actuator 226 is of a specific internal design that is employed with a particular routing of the pressurized hydraulic fluid, as will be discussed below, to provide an interlock that hydraulically prohibits an attempt to engage a synchronizer if another synchronizer on the same shaft is already engaged. Each of the shift actuators 226 includes at least one interlock passage, generally indicated at 364 in FIG. 2B. In the preferred embodiment, the shift actuator 226 includes two interlock passages 370 and 374. More specifically, the main valve 298 includes two circumferential annular grooves that form the interlock passages 370 and 374. There are two inlets 378, 380 and two outlets 382, 384 formed in the outer case 286. The inlets 378 and 380 are in fluid communication with a source of pressurized hydraulic fluid as will be discussed below. The outlets are in fluid communication with an associated shift actuator 226 on the same shaft to operatively actuate the associated shift actuator 26.

The interlock passages 370 and 374 are adapted to be open and provide fluid communication from the inlets 378, 380 to the outlets 382, 384 when the shift actuator 26 is in the non-engaged, or neutral position. When the shift actuator 226 is in an engaged position, the interlock passages 370 and 374 do not align with the inlets 378, 380 and outlets 382, 384 so that fluid communication is blocked at the inlets 378, 380. For example, with the shift actuator in its neutral, non-actuated position, inlet 378 is operatively connected to outlet 382 through interlock passage 372 and inlet 380 is operatively connected to outlet 384 through interlock passage 374. However, if the shift actuator 226 is operatively actuated and engaged to either the right or the left, the inlets 378 and 380 are not in fluid communication with the outlets 382 and 384 (i.e. interlock passages 370 and 374 are blocked). This is in contrast to the previously discussed embodiment of FIGS. 2A and 3, in which the interlock passages (170, 172, 174, and 176) are open when the shift actuators 26 are engaged. Thus, when the shift actuator 226 is in an engaged position, the interlock passages will not align with their respective inlets and outlets, which blocks fluid communication between the inlets 378 and 380 and the associated shift actuator 226 so that the associated shift actuator cannot be actuated. In this manner, only one shift actuator, and thereby only one synchronizer and one gear set, can be engaged on the same shaft at a time.

Figure 4:
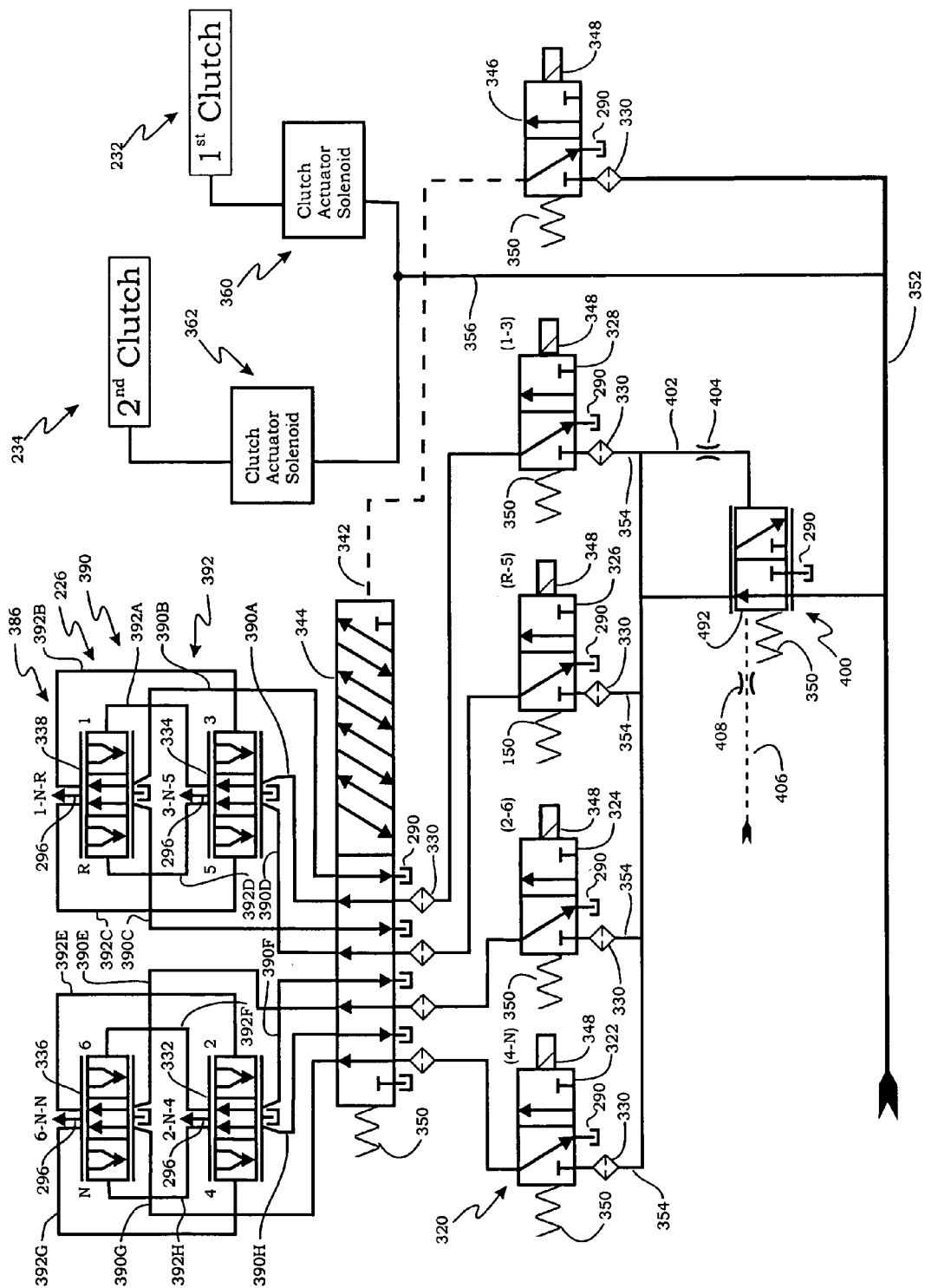
FIG. 4 is a schematic illustration of another example of a hydraulic actuation interlock circuit for the synchronizers of a dual clutch transmission of the type that utilizes the shift actuator of FIG. 2B and may be employed by the present invention.

Referring to FIG. 4, the synchronizer circuit schematically illustrated and generally indicated at 386 includes four shift actuators 226 (FIG. 2B). Each of the shift actuators 226 is operatively controlled by the actuator solenoids 320 through the multiplex valve 344. In this embodiment of the present invention, the interlock circuit 186 includes a plurality of actuator hydraulic lines to provide fluid communication from the multiplex valve 144 to the shift actuators 26. Each of the plurality of hydraulic actuator lines are split having a first branch, generally indicated at 390 and a second branch, generally indicated at 392. The first, or supply branch 390 is in fluid communication with the source of pressurized hydraulic fluid from the multiplex valve 144 to the inlet 378, 380 of a first shift actuator 226. The second, or charge branch 192 provides fluid communication between the outlet 382, 384 of the first shift actuator 226 to an associated shift actuator 226 to actuate the associated shift actuator 226.

For clarity in FIG. 4, each supply branch 390 and its associated charge branch 392 are indicated as a pair by a letter designation (A through H). For example, supply branch 390A is routed from the multiplex valve 344 to an inlet (378, 380) of shift actuator 334 (3-N-5). The associated charge branch 396A is routed from a respective outlet (382, 384) of shift actuator 334 (3-N-5) to the right side of shift actuator 338 (1-N-R). Thus, when pressurized hydraulic fluid is selectively provided by actuator solenoid 328 through multiplex valve 344 to supply branch 390A and charge branch 392A, the fluid force will cause shift actuator 338 to move to the left and engage the first gear set depending upon the position of shift actuator 334 (3-N-5).

More precisely, if shift actuator 334 (3-N-5) is in the neutral position, meaning that neither the third or the fifth gear sets are engaged, then the interlock passages in shift actuator 334 are open so that the fluid pressure in the supply branch 394A and the charge branch 396A is applied to move shift actuator 338 to the left to engage the first gear set. However, if shift actuator 334 is in either engaged position (third or fifth gear), the interlock passages (374 and 380) through shift actuator 334 are blocked preventing the fluid pressure in the supply branch 394A from passing through the interlock passage (374 or 380) to the charge branch 396A. Thus, first gear is prevented from engaging (interlocked) when either the third or fifth gear sets are already engaged.

Similarly, in the remainder of the synchronizer actuation interlock circuit for the first input shaft (1, 3, 5, and R), charge branch 392B is blocked preventing third gear from engaging (interlocked) when either the first or reverse gear sets are already engaged; charge branch 392C is blocked preventing fifth gear from engaging when either first or reverse gears are already engaged; and charge branch 392D is blocked preventing reverse gear from engaging when either third or fifth gears are already engaged. In the synchronizer actuation interlock circuit for the second input shaft (2, 4, and 6), charge branch 392E is blocked preventing second gear from engaging (interlocked) when sixth gear is already engaged; charge branch 392F is blocked preventing sixth gear from engaging when either second or fourth gears are already engaged; charge branch 392G is blocked preventing fourth gear from engaging when sixth gear is already engaged; and charge branch 392H is blocked preventing sixth gear from engaging when either second or fourth gears are already engaged.

Thus, the present invention overcomes the limitations of the current synchronizer control schemes by providing a hydraulic synchronizer actuation interlock system that operatively prevents the concurrent engagement of two synchronizers on the same shaft at the same time. The present invention accomplishes this separately and independently from existing control methods. Thus, the present invention not only provides the advantage of avoiding catastrophic failures relating to gear box "tie-ups" but also provides the advantage of operating beyond the boundaries of the control system and its inability to detect possible synchronizer failures when errant monitoring of transmission functions, failure of sensing devices, or failures occur in control method steps.

The present invention has been described in an illustrative manner. It is to be understood that the terminology that has been used is intended to be in the nature of words of description rather than of limitation. Many modifications and variations of the present invention are possible in light of the above teachings. Therefore, within the scope of the appended claims, the present invention may be practiced other than as specifically described.

We claim:

1. A dual clutch transmission for a motor vehicle having a synchronizer actuation interlock system including:
   a pair of input shafts;
   a counter shaft;
   a plurality of gear sets rotatively disposed on said pair of input shafts and said counter shaft, said plurality of gear sets adapted to be operatively engaged to and disengaged from their respective shafts;
   a plurality of synchronizers disposed about said gear sets, said plurality of synchronizers adapted to operatively engage and disengage said gear sets to and from their respective shafts;
   a plurality of hydraulically actuated shift actuators each operatively connected to one of said plurality of synchronizers, each of said plurality of shift actuators adapted to cause the associated synchronizer to engage and disengage the associated gear sets to and from the associated shaft and further adapted to provide a hydraulic interlock that prevents an associated shift actuator on the same shaft from hydraulically actuating when said shift actuator is already in engaged position.

2. A dual clutch transmission as set forth in claim 1 wherein said plurality of synchronizers are each two sided, dual action synchronizers and said plurality of gear sets are grouped in pairs, such that each of said plurality of synchronizers are slidingly disposed on one of said shafts between each said gear set of said gear set pairs, each one of said plurality of synchronizers adapted to separately engage and disengage each said gear set of said respective gear set pairs to and from the associated shaft.

3. A dual clutch transmission as set forth in claim 1 wherein said plurality of shift actuators are each two-way, dual action hydraulic valve assemblies each having a shifter fork that is in sliding contact with one of said plurality of synchronizers, said shift actuators adapted to be driven hydraulically in rectilinear fashion, parallel to said shafts, so as to move the associated shift fork, synchronizer, and gear sets between said engaged and said disengaged positions.

4. A dual clutch transmission as set forth in claim 1 wherein each of said plurality of shift actuators further include at least one interlock passage operatively formed within each one of said plurality of shift actuators and having an inlet and an outlet, said interlock passage adapted to provide fluid communication from said inlet to said outlet when said shift actuator has moved the associated synchronizer to said engaged position, said interlock passage also adapted to block fluid communication when said shift actuator is in said disengaged position.

5. A dual clutch transmission as set forth in claim 4 wherein said transmission further includes a plurality of hydraulic lines, each one of said plurality of hydraulic lines including a first branch and a second branch, said first branch in fluid communication with a source of pressurized hydraulic fluid and a first one of said plurality of shift actuators, said first branch adapted to selectively provide pressurized hydraulic fluid to actuate said first shift actuator, said second branch in fluid communication between said first branch and said interlock passage inlet of a second one of said plurality of shift actuators, said first and said second shift actuators operatively disposed about the same one of said input shafts and said counter shaft such that said first shift actuator may be selectively actuated if said second shift actuator is in said disengaged position and said interlock passage of said second shift actuator is blocked and such that said first shift actuator is prevented from being selectively actuated if said second shift actuator is already in said engaged position by dissipating said pressurized hydraulic fluid through said interlock passage to said outlet.

6. A dual clutch transmission as set forth in claim 5 wherein said outlet of each of said plurality of shift actuators is in fluid communication with the hydraulic fluid sump of said transmission.

7. A dual clutch transmission as set forth in claim 1 wherein each of said plurality of shift actuators further include at least one interlock passage operatively formed within each one of said plurality of shift actuators and having an inlet and an outlet, said interlock passage adapted to be open and provide fluid communication from said inlet through said shift actuator to said outlet when said shift actuator has moved the associated synchronizer to said disengaged position, said interlock passage also adapted to be closed and block fluid communication through said shift actuator when said shift actuator is in said engaged position.

8. A dual clutch transmission as set forth in claim 7 wherein said transmission further includes a plurality of hydraulic lines, each one of said plurality of hydraulic lines including a first branch and a second branch, said first branch in fluid communication with a source of pressurized hydraulic fluid and said interlock passage of a first one of said plurality of shift actuators, said second branch in fluid communication between said outlet of said interlock passage of said first shift actuator and a second one of said plurality of shift actuator, said first and said second shift actuators operatively disposed about the same one of said input shafts and said counter shaft such that said second shift actuator may be selectively actuated if said first shift actuator is in said disengaged position and said interlock passage is open and such that said second shift actuator is prevented from being selectively actuated if said first shift actuator is already in said engaged position and said interlock passage is blocked.

9. A dual clutch transmission for a motor vehicle having a synchronizer actuation interlock system including:
  a pair of input shafts;
  a counter shaft;
  a plurality of gear sets grouped into pairs and rotatively disposed on said input shafts and said counter shaft, said gear set pairs adapted to be operatively engaged with and disengaged from their respective shafts;
  a plurality of two sided, dual action synchronizers slidingly disposed on said inputs shafts and said counter shaft between each said gear set of said gear set pairs, each one of said plurality of synchronizers thereby adapted to separately engage and disengage each said gear set of said respective gear set pairs to and from the associated shaft;
  a plurality of hydraulically actuated two-way, dual action hydraulic valve assemblies each having a shifter fork that is in sliding contact with one of said plurality of synchronizers, each one of a plurality of shift actuators operatively connected to one of said plurality of synchronizers and adapted to cause the associated synchronizer to engage and disengage the associated gear set pairs from the associated shaft;
  at least one interlock passage operatively formed within each of said plurality of shift actuators and having an inlet and an outlet, said interlock passage adapted to provide fluid communication from said inlet to said outlet when said shift actuator has moved the associated synchronizer to said engaged position, said interlock passage also adapted to block fluid communication when said shift actuator is in said disengaged position; and
  a plurality of hydraulic lines, each one of said plurality of hydraulic lines including a first branch and a second branch, said first branch in fluid communication with a source of pressurized hydraulic fluid and a first one of said plurality of shift actuators and adapted to selectively provide pressurized hydraulic fluid to actuate said first one of said plurality of shift actuators, said second branch providing fluid communication between said first branch and said interlock passage inlet of a second one of said plurality of shift actuators, said first and said second shift actuators operatively disposed about the same one of said input shafts and said counter shaft such that said first shift actuator may be selectively actuated if said second shift actuator is in said disengaged position and said interlock passage of said second shift actuator is blocked, and such that said first shift actuator is prevented from being selectively actuated if said second shift actuator is already in said engaged position by dissipating said pressurized hydraulic fluid through said interlock passage to said outlet.

10. A dual clutch transmission for a motor vehicle having a synchronizer actuation interlock system including:
   a pair of input shafts;
   a countershaft;
   a plurality of gear sets grouped into pairs and rotatively disposed on said input shafts and said counter shaft, said gear set pairs adapted to be operatively engaged with and disengaged from the associated shaft;
   a plurality of two sided, dual action synchronizers slidingly disposed on one of said shafts between each said gear set of said gear set pairs, each of said plurality of synchronizers adapted to separately engage and disengage each said gear set of said respective gear set pairs to and from the associated shaft;
   a plurality of hydraulically actuated two-way, dual action hydraulic valve assemblies each having a shifter fork that is in sliding contact with one of said plurality of synchronizers, each one of a plurality of shift actuators operatively connected to one of said plurality of synchronizers and adapted to cause the associated synchronizer to engage and disengage the associated gear set pairs from the associated shaft;
   at least one interlock passage operatively formed within each of said plurality of shift actuators and having an inlet and an outlet, said interlock passage adapted to provide fluid communication from said inlet through said shift actuator to said outlet when said shift actuator has moved the associated synchronizer to said disengaged position, said interlock passage also adapted to block fluid communication through said shift actuator when said shift actuator is in said engaged position; and
   a plurality of hydraulic lines, each of said plurality of hydraulic lines including a first branch and a second branch, said first branch in fluid communication with a source of pressurized hydraulic fluid and said interlock passage of a first one of said plurality of shift actuators, said second branch in fluid communication between said outlet of said interlock passage of said first shift actuator and a second one of said plurality of shift actuators, said first and said second shift actuators operatively disposed about the same one of said input shafts and said countershaft such that said second shift actuator may be selectively actuated if said first shift actuator is in said disengaged position and said interlock passage is open, and such that said second shift actuator is prevented from being selectively actuated if said first shift actuator is already in said engaged position and said interlock passage is blocked.

* * * * *